(12) United States Patent
Jeong et al.

(10) Patent No.: US 10,037,225 B2
(45) Date of Patent: Jul. 31, 2018

(54) METHOD AND SYSTEM FOR SCHEDULING COMPUTING

(71) Applicant: Samsung Electronics Co., Ltd., Suwon-si (KR)

(72) Inventors: Hyunku Jeong, Seo-gu (JP); Sungmin Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/775,021

(22) PCT Filed: Mar. 11, 2014

(86) PCT No.: PCT/KR2014/001978
§ 371 (c)(1),
(2) Date: Sep. 11, 2015

(87) PCT Pub. No.: WO2014/142498
PCT Pub. Date: Sep. 18, 2014

(65) Prior Publication Data
US 2016/0019089 A1    Jan. 21, 2016

(30) Foreign Application Priority Data
Mar. 12, 2013   (KR) .................. 10-2013-0026237

(51) Int. Cl.
*G06F 9/46*  (2006.01)
*G06F 9/48*  (2006.01)
*G06F 9/50*  (2006.01)

(52) U.S. Cl.
CPC .............. *G06F 9/46* (2013.01); *G06F 9/4881* (2013.01); *G06F 9/5061* (2013.01)

(58) Field of Classification Search
None
See application file for complete search history.

(56) References Cited

U.S. PATENT DOCUMENTS

| 7,024,671 | B2 | 4/2006 | Yamashita |
| 7,457,886 | B1 * | 11/2008 | Smith ................. G06F 9/485 710/100 |
| 8,145,806 | B2 | 3/2012 | Lee et al. |

(Continued)

FOREIGN PATENT DOCUMENTS

| JP | 2002-007364 A | 1/2002 |
| KR | 10-2009-0005921 A | 1/2009 |
| KR | 1113943 B1 | 2/2012 |

OTHER PUBLICATIONS

International Search Report corresponding to International Patent Application No. PCT/KR2014/001978, dated Jun. 27, 2014.

*Primary Examiner* — Sisley Kim
(74) *Attorney, Agent, or Firm* — McAndrews, Held & Malloy, Ltd.

(57) ABSTRACT

Provided is a method and system for scheduling computing so as to meet the quality of service (QoS) expected in a system by identifying the operation characteristic of an application in real time and enabling all nodes in the system to dynamically change the schedulers thereof organically between each other. The scheduling method includes: detecting an event of requesting a scheduler change; selecting a scheduler corresponding to the event among schedulers; and changing a scheduler of a node, which schedules use of the control unit, to the selected scheduler, without rebooting the node.

15 Claims, 12 Drawing Sheets

(56) References Cited

U.S. PATENT DOCUMENTS

| | | |
|---|---|---|
| 2005/0197936 A1 | 9/2005 | Berstis et al. |
| 2009/0007121 A1 | 1/2009 | Yamada et al. |
| 2009/0019449 A1 | 1/2009 | Choi et al. |
| 2009/0228888 A1 | 9/2009 | Vengerov et al. |
| 2010/0131957 A1* | 5/2010 | Kami .................... G06F 9/5077 718/104 |
| 2011/0225583 A1* | 9/2011 | Suh ....................... G06F 9/4887 718/1 |
| 2012/0110591 A1* | 5/2012 | Ghosh ................. G06F 11/3604 718/104 |
| 2012/0216205 A1 | 8/2012 | Bell, Jr. et al. |
| 2012/0222042 A1 | 8/2012 | Chess et al. |
| 2015/0095919 A1* | 4/2015 | Vincent ................ G06F 9/5016 718/104 |

* cited by examiner

METHOD AND SYSTEM FOR SCHEDULING COMPUTING

CROSS-REFERENCE TO RELATED APPLICATIONS/INCORPORATION BY REFERENCE

This application is a 371 of International Patent Application No. PCT/KR2014/001978, filed Mar. 11, 2014, entitled "METHOD AND SYSTEM FOR SCHEDULING COMPUTING", which claims priority to Korean Patent Application No. 10-2013-0026237, filed Mar. 12, 2013, entitled "METHOD AND SYSTEM FOR SCHEDULING COMPUTING". The above-identified applications are hereby incorporated herein by reference in their entirety.

TECHNICAL FIELD

The present invention relates to a method and system for scheduling computing, and, particularly, to a method and system for scheduling the use of a computer adaptively to an application which is provided in the computer.

BACKGROUND ART

A cluster system includes a plurality of servers connected to each other through a network. A micro-server has a structure in which multiple computing nodes (e.g. computing cards) having a central processing unit (CPU) and a memory share a storage device. The micro-server is similar to the cluster system in that computing nodes are connected to each other through a system bus. That is to say, servers in the cluster system are connected to each other through a network, while computing nodes in the micro-server are connected to each other through a system bus. Hereinafter, in order to avoid confusion of terms, a system will represent a cluster system or a micro-server. A node will represent one server in a cluster system or one computing node in a micro-server.

A service provider uses a system to execute various applications, such as a web server, a database (DB) server, an index server, a cache server, or the like. Since the respective applications have mutually different operation characteristics and requirements, and users' use patterns of the applications are also different from each other, the performance and operation characteristic required to the system may vary depending on time.

FIG. 1 is a diagram showing an example of a conventional method for scheduling computing. As shown in FIG. 1, a system can operate a plurality of web servers. That is to say, each node in the system operates by a web server. In a system as shown in FIG. 1, all the nodes operate by web servers by day during which user requests are many. By night during which, generally, requests are a few, the web servers migrate to a few nodes, and the remaining nodes are powered off in order to reduce power consumption.

It is important to increase the throughput of requests per unit time when a web server operates on each node. However, when a plurality of web servers operate on one node, it is necessary not only to increase the throughput, but also to fair-share system resources including a central processing unit (CPU) to the respective web servers. In such a state, in order to ensure the performance expected to the system, it is necessary for the scheduler of each node to change the performance or operation characteristic thereof depending on time or situations.

FIG. 2 is a diagram showing another example of a conventional method for scheduling computing. As shown in FIG. 2, after web servers migrate, a node may not be powered off, but may execute another application, for example, a Hadoop or the like. Tasks processed by a web server are characterized by small data, random access, and interactivity, while a Hadoop is characterized by large data, sequential access, and batch. In such an example, it is necessary to adaptively change the scheduler of each node to be suitable for tasks according to states, in order to meet the quality of service (QoS) desired by a service provider.

FIG. 3 is a diagram showing a still another example of a conventional method for scheduling computing. Real-time tasks and non-real-time tasks may be divided into and executed on multiple nodes according to states, and such a case is shown in FIG. 3. An example of real-time tasks is a video transcoding and streaming service. Since a real-time task must process a request within a set deadline, a scheduler schedules the task in consideration of the priority of the task, a period, a deadline, and the like. However, a non-real-time task does not require such a complicated calculation, which may just deteriorate the performance thereof.

The conventional scheduling methods as described above are generally focused on the techniques of: monitoring the operation of a system; and controlling the voltage or frequency of a central processing unit (CPU) or enabling all nodes to uniformly perform tasks through load balancing with a result of the monitoring, mainly, for the purpose of reducing power consumption.

As described above, since each node executes applications having mutually different operations characteristics according to time or according to states, a system must be able to recognize such a state and, accordingly, to change the operation characteristic of a scheduler by itself. However, the conventional system has no function of dynamically changing a scheduler without rebooting, and thus there is a limit in the optimization of performance in a state in which an application is changed.

DISCLOSURE OF INVENTION

Technical Problem

The present invention has been made in order to solve the above problems, and relates to a method and system for scheduling computing so as to meet the quality of service (QoS) expected in a system by identifying the operation characteristic of an application in real time and enabling all nodes in the system to dynamically change the schedulers thereof organically between each other.

Solution to Problem

In order to achieve the objects, a scheduling method of a control unit includes; detecting an event of requesting a scheduler change; selecting a scheduler corresponding to the event among schedulers; and changing a scheduler of a node, which schedules use of the control unit, to the selected scheduler, without rebooting the node.

In order to achieve the objects, a system for providing an application service includes: a master node for determining a scheduling policy and scheduling computing according to the determined policy; and at least one slave node for scheduling computing according to the determined policy, wherein the master node determines the scheduling policy using application information received from the slave node and application information of the master node, transmits the determined scheduling policy to the slave node, selects a scheduler corresponding to the determined scheduling policy among schedulers, and changes a scheduler of the master node to the selected scheduler without rebooting.

Advantageous Effects of Invention

In accordance with the present invention, the operation characteristic of an application is identified in real time, and all nodes in a system can dynamically change the schedulers thereof organically between each other, so that a computing scheduling method and system to meet the quality of service (QoS) expected in the system can be provided.

MODE FOR THE INVENTION

First of all, terms and words used hereinafter should be interpreted not in a limited normal or dictionary meaning, but to include meanings and concepts conforming with technical aspects of the present invention. Therefore, the configurations described in the specification and drawn in the figures are just exemplary embodiments of the present invention, not to show all of the technical aspects of the present invention. Therefore, it should be understood that there may be various equalities and modifications to be replaced with them. In addition, some components in the accompanying drawings are exaggerated, omitted, or schematically shown. Accordingly, the size of each component does not thoroughly reflect the real size of the component. Therefore, the present invention is not limited by the relative sizes of or interval between components shown in the accompanying drawings.

Figure 1:
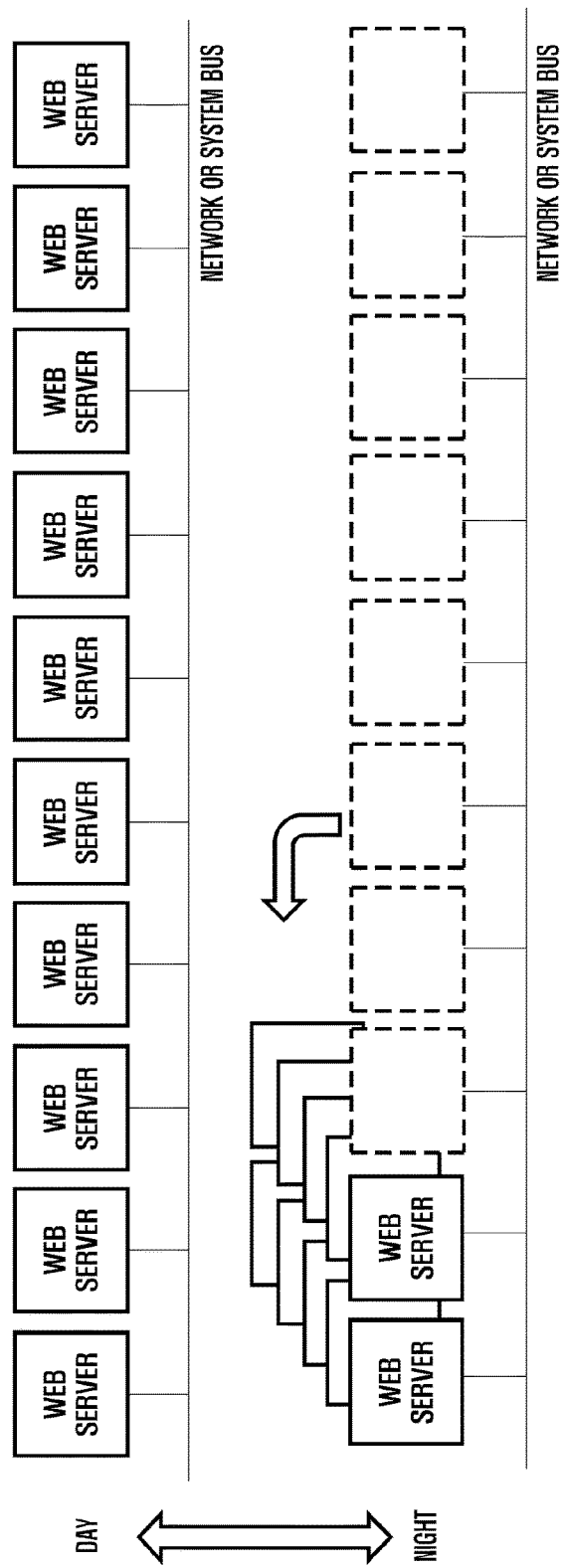
FIG. 1 is a diagram showing an example of a conventional method for scheduling computing.
Figure 2:
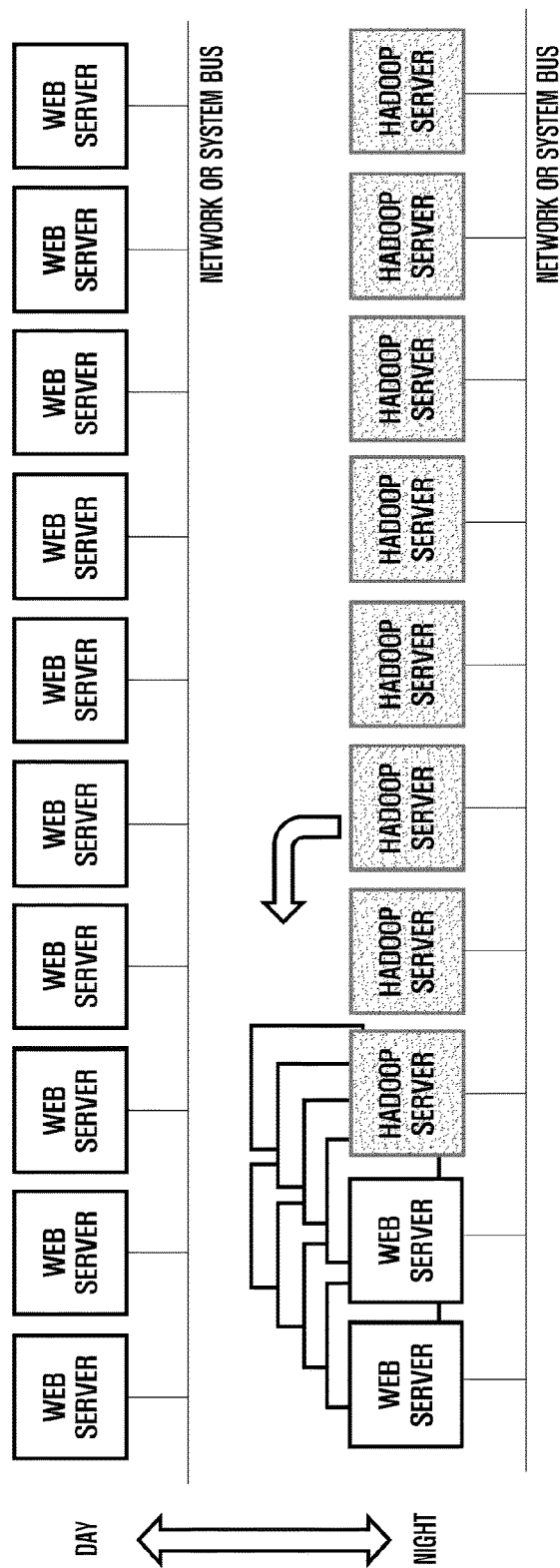
FIG. 2 is a diagram showing another example of a conventional method for scheduling computing.
Figure 3:
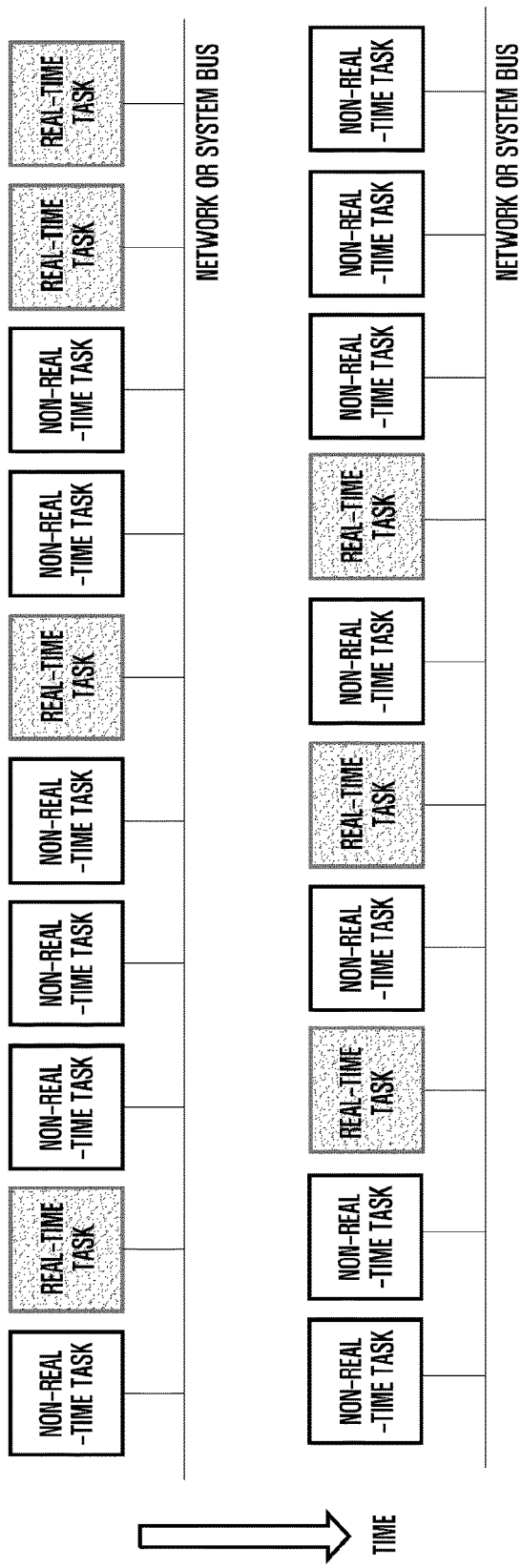
FIG. 3 is a diagram showing a still another example of a conventional method for scheduling computing.
Figure 4:
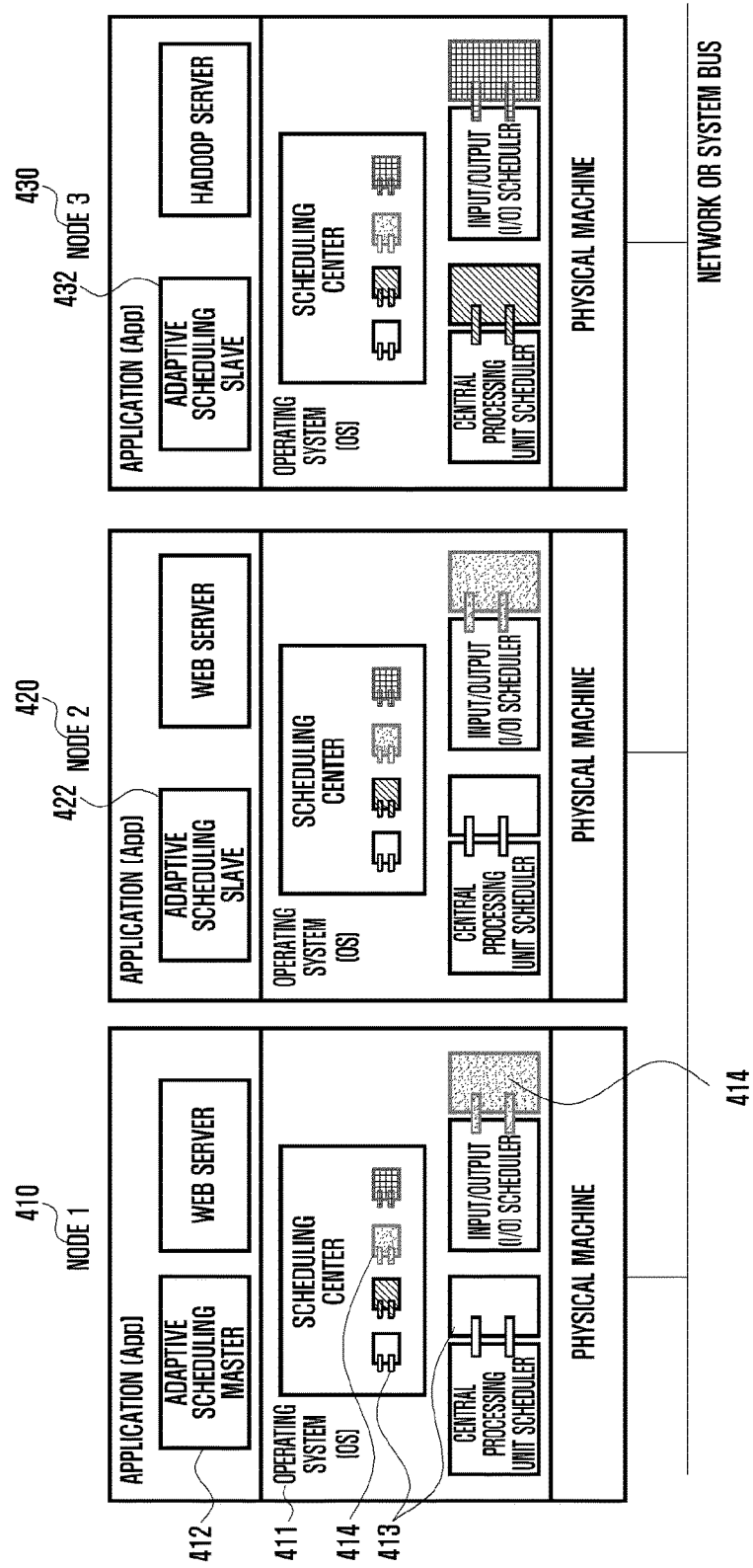
FIG. 4 is a diagram illustrating the configuration of a scheduling system according to an embodiment of the present invention.

FIG. 4 is a diagram illustrating the configuration of a scheduling system according to an embodiment of the present invention. Referring to FIG. 4, according to an embodiment of the present invention, the scheduling system includes a plurality of nodes, for example, first to third nodes 410 to 430, respectively. Each of the nodes 410 to 430 is one server in a cluster system, or one computing node in a micro-server. Here, the first node 410 is a master node for determining a scheduling policy and scheduling computing, e.g. "the times for which and the orders at which threads use a central processing unit (CPU)" on the basis of the determined policy, and the remaining nodes 420 and 430 are slave nodes for scheduling computing according to the policy determined by the first node 410.

Each node includes a physical machine, an operating system, and applications. In a hierarchical structure, an operating system is placed on a physical machine, and applications are placed on the operating system. The physical machine is configured to include a central processing unit (CPU), a graphic processing unit (GPU), a main memory unit, a secondary memory unit, an input unit, an output unit, and the like. As well known, the central processing unit (CPU) is a core control unit of a computer system for performing data operation and comparison, interpretation and execution of instructions, and the like. The central processing unit (CPU) includes various registers for temporarily storing data or instructions. The graphic processing unit (GPU) is a graphic control unit for performing operation and comparison of graphic-related data, and analysis and execution of instructions, and the like, instead of the central processing unit (CPU). Each of the central processing unit (CPU) and the graphic processing unit (GPU) may be integrated into one package of a single integrated circuit formed of two or more independent cores (e.g. a quad-core). That is to say, central processing units (CPUs) may be integrated into one multicore processor. In addition, a plurality of graphic processing units (GPUs) may be integrated into one multicore processor. In addition, the central processing unit (CPU) and the graphic processing unit (GPU) may be integrated into one integrated chip (i.e. System on Chip (SoC)). In addition, the central processing unit (CPU) and the graphic processing unit (GPU) may be packaged into a multi-layer. Meanwhile, the configuration including the central processing unit (CPU) and the graphic processing unit (GPU) may be referred to as an application processor (AP). The main memory unit includes, for example, a RAM. The main memory unit stores various programs, for example, a booting program, an operating system, and applications, which are loaded from the secondary memory unit. That is to say, the central processing unit (CPU), the graphic processing unit (GPU), and the application processor (AP) access the programs loaded on the main memory unit, interpret instructions of the programs, and execute functions according to interpretation results. The input unit may be configured to include a touch panel provided on a screen of a display unit or a keypad unit. The output unit may be configured to include a display unit and a communication unit. For example, the display unit includes a display panel, such as a liquid crystal display (LCD), an organic light emitted diode (OLED), an active matrix organic light emitted diode (AMOLED), a flexible display, or the like. The communication unit communicates with an external device through a network.

The operating system of a node is configured to include a scheduling center having a plurality of central processing unit (CPU) schedulers and a plurality of input/output (I/O) schedulers, a central processing unit (CPU) scheduler interface, and an input/output (I/O) scheduler interface. A process (i.e. a program being executed) is constituted by multiple threads. Each of the threads may be likened to a "laborer", and the central processing unit (CPU) or the input/output (I/O) may be likened to a "hammer". In addition, a task is likened to an action which the laborer performs with the hammer. In this case, a scheduler (which also is one of processes) is likened to a "manager" who manages a task which a thread performs with the central processing unit (CPU) or the input/output (I/O). That is to say, a thread is a component of an operating system for managing time for which threads use the central processing unit (CPU) and input/output (I/O) (i.e. queuing time in ready queue), order in which the threads use the central processing unit (CPU) and input/output (I/O) (i.e. enqueuing order into ready queue), and the like.

When a thread is enqueued in a ready queue, the central processing unit (CPU) accesses the ready queue and processes the thread. In other words, the thread enqueued in the ready queue performs a task using the central processing unit (CPU). When the processing of the thread has been completed, the corresponding thread is dequeued from the ready queue. Such a ready queue may be configured with a register of the central processing unit (CPU), a main memory, a cache memory, or the like. In addition, ready queues may be configured according to processes. For example, a ready queue for a web server and a ready queue for a scheduler are separately configured. In addition, a ready queue is sometimes called a run queue.

A scheduler is divided into a common part and a specialized part. The common part is configured with a common algorithm between schedulers. For example, an algorithm t, such as "process four threads of a first mathematical operation process Math1, and two threads of a second mathematical operation process Math2", may be a common part. The specialized part is configured with different algorithms depending on schedulers, respectively. For example, an algorithm, such as "uniformly assign the use time of a central processing unit (CPU) to processes having the same priority (i.e. fixed priority schedule)" or "assign the use time of the central processing unit (CPU) according to weights (i.e. fair-share schedule)", may be a specialized part.

The scheduling center has a plurality of central processing unit (CPU) schedulers and a plurality of input/output (I/O) schedulers, and dynamically changes a scheduler (particularly, the specialized part) or adjusts the parameters (e.g. a priority, a weight, and the like) of the scheduler in response to an instruction of an upper-layer application. The operating system has a scheduler interface capable of changing a scheduler (i.e. specialized parts) without exerting an influence on other internal components. That is to say, the central processing unit (CPU) scheduler interface is connected to a scheduler (e.g. a scheduler 413) selected by the scheduling center. The input/output (I/O) scheduler also is connected to a scheduler (e.g. a scheduler 414) selected by the scheduling center.

A plurality of applications is placed on the operating system. Specially, an adaptive scheduling master 412 is placed on an operating system 411 of a master node 410. The master 412 determines a scheduling policy, and transmits the policy to the scheduling center of the master node 410. In addition, the master 412 transmits the policy to the slave nodes 420 and 430. The adaptive scheduling slaves 422 and 432 of the slave nodes 420 and 430 receive the policy, and transmit the policy to the respective scheduling centers thereof. In addition, the adaptive scheduling slaves periodically transmit, to the master node, information representing which application is being executed. FIG. 4 illustrates a case where the application being executed is a web server, but the present invention is not limited thereto. That is to say, an application other than a web server may be placed on the operating system. In addition, various applications may be placed on the operating system.

Figure 5:
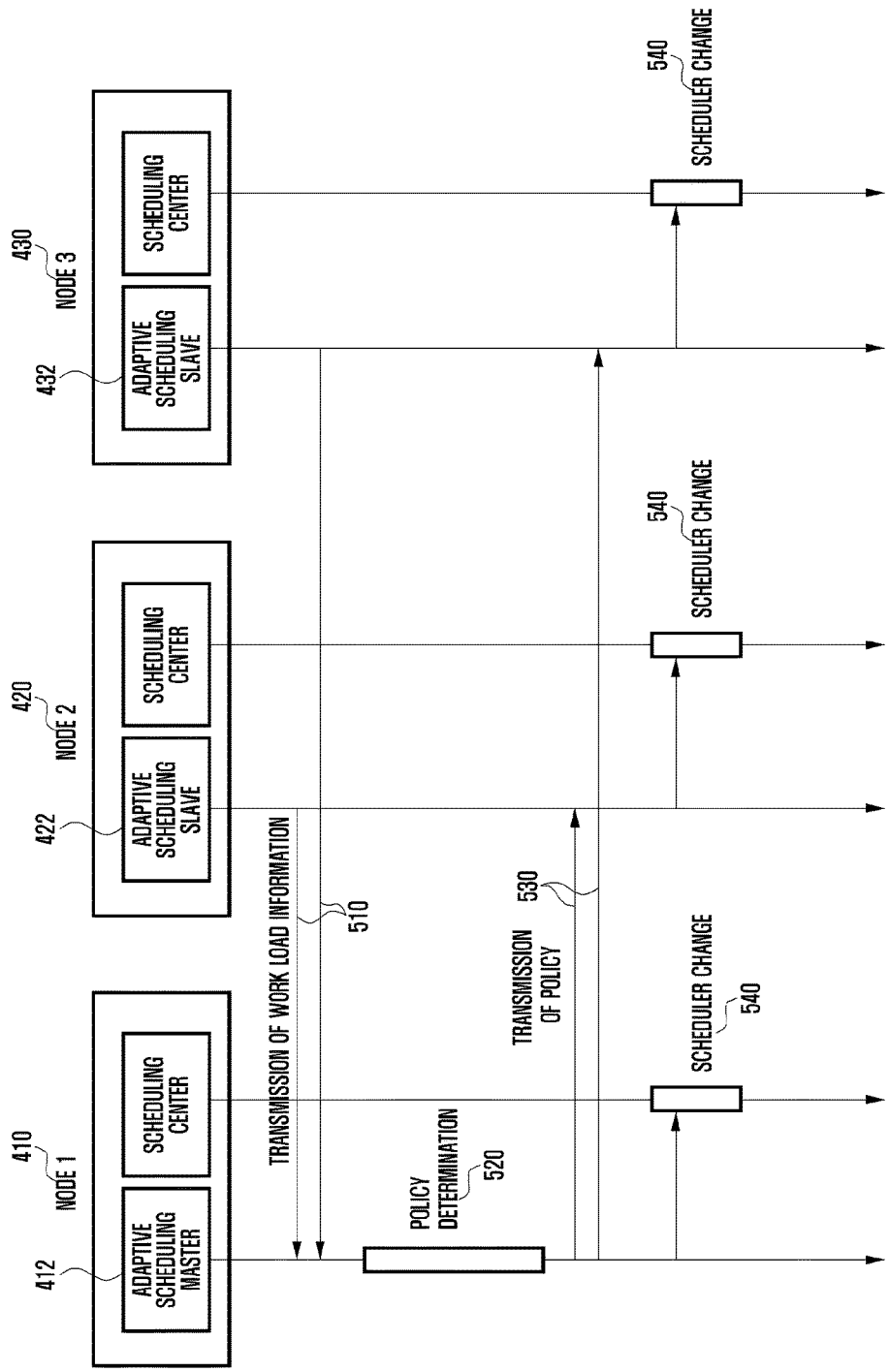
FIG. 5 is a flowchart explaining a scheduling method according to an embodiment of the present invention.

FIG. 5 is a flowchart explaining a scheduling method according to an embodiment of the present invention.

Referring to FIGS. 4 and 5, the slave nodes 420 and 430 transmit application information to the master node 410 at step 510. Here, the application information includes an application name (e.g. a database, a cache, a Hadoop, or the like), information related to an operation characteristic (e.g. real-time (RT) or non-real-time (NRT)), information related to whether there is interactivity, information related to whether a batch is performed, a priority, a weight, a deadline, a period, and the like. At step 520, the adaptive scheduling master 412 of the master node 410 determines a scheduling policy (e.g. what are the optimal central processing unit (CPU) and input/output (I/O) schedulers suitable for the respective nodes, and which parameters are to be used in the scheduler) using application information. At step 530, the master node 410 transmits the policy to the slave nodes 420 and 430. At step 540, the master 412 and the slaves 422 and 432 transfer the policy to the scheduling centers thereof, respectively. The scheduling center dynamically changes the central processing unit (CPU) scheduler or input/output (I/O) scheduler thereof or adjusts parameters according to the policy. The change of a scheduler will be described in detail with reference to FIGS. 6 and 7.

Figure 6:
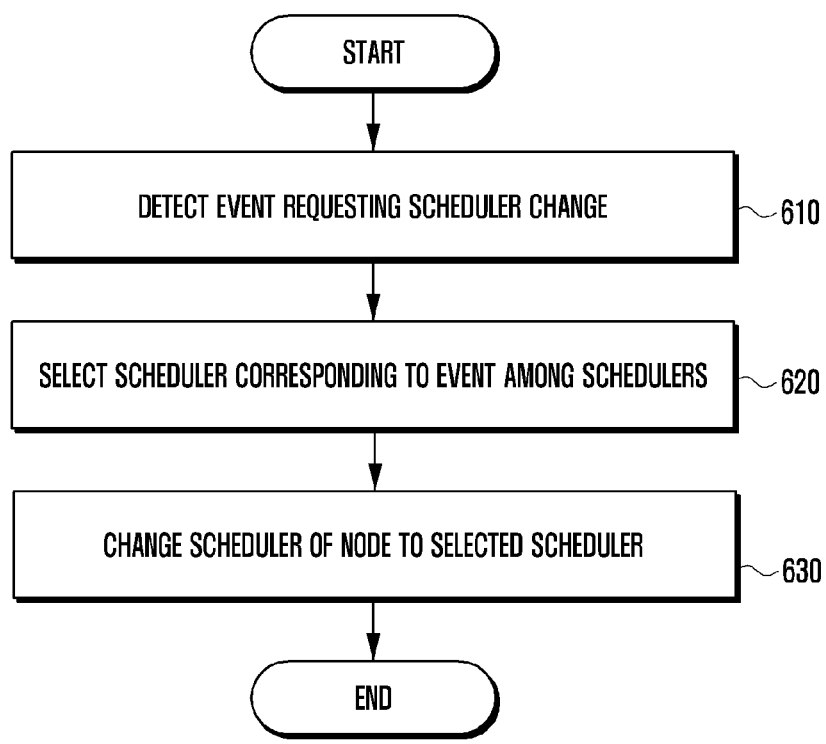
FIG. 6 is a flowchart explaining a scheduler change method according to an embodiment of the present invention.
Figure 7:
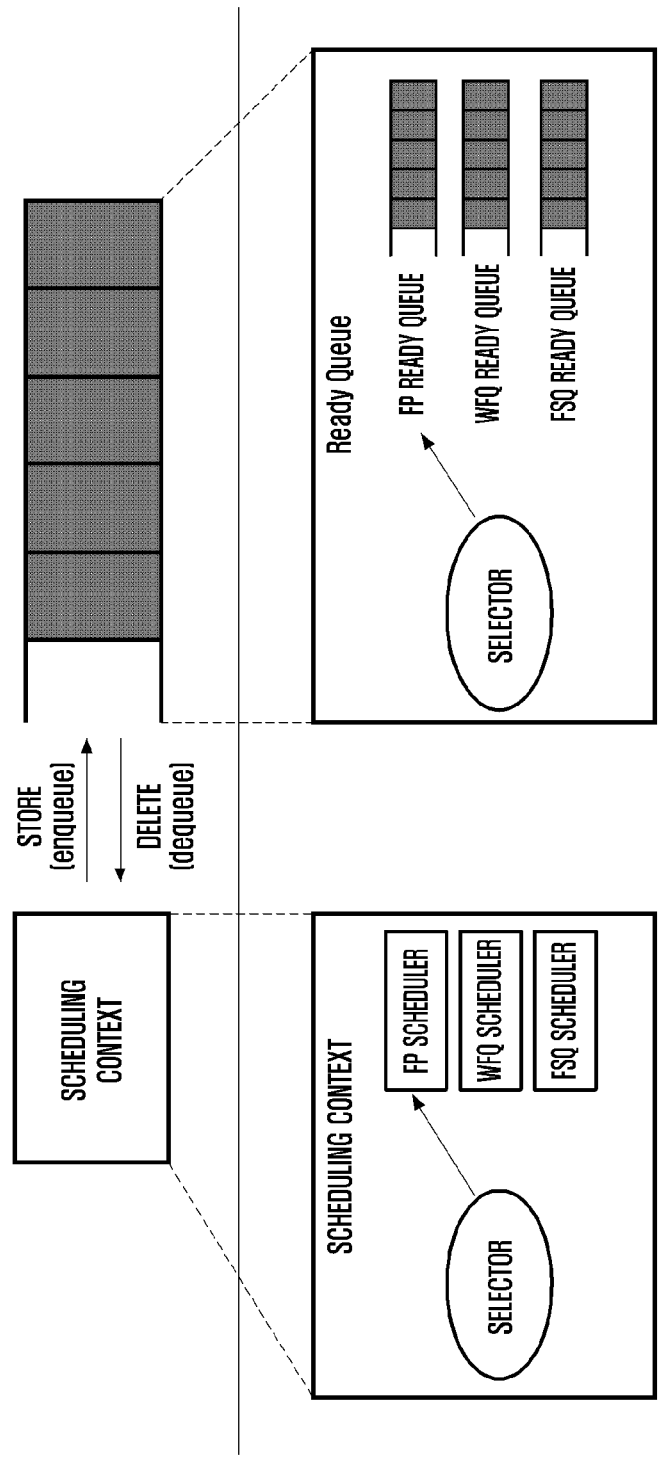
FIG. 7 is a diagram illustrating the configuration of a dynamically changeable central processing unit (CPU) scheduler.

FIG. 6 is a flowchart explaining a scheduler change method according to an embodiment of the present invention. FIG. 7 is a diagram illustrating the configuration of a dynamically changeable central processing unit (CPU) scheduler.

Referring to FIGS. 6 and 7, a node detects an event of requesting a scheduler change at step 610. For example, an "adaptive scheduling slave" of a slave node receives an event including a policy from a master node. The "adaptive scheduling slave" transfers the policy to the scheduling center thereof. Then, the scheduling center of the slave node detects reception of the policy. As another example, an "adaptive scheduling master" of a master node determines a policy, and transfers the policy to the scheduling center thereof. Then, the scheduling center of the master node detects reception of the policy. As still another example, the scheduling center of a node (a master or a slave) detects an event of requesting a scheduler change from an input unit. That is to say, a manager of the system may change the policy.

At step 620, the scheduling center selects a scheduler (particularly, a specialized part), among schedulers, corresponding to the event. Referring to FIG. 7, a thread has a scheduling context. Depending on how to manage the scheduling context in a ready queue, the scheduler of a corresponding node varies. According to the present invention, the scheduling context and the ready queue are divided into a common part and a specialized part depending thereon. That is to say, the specialized part is modularized and separated from a common part. Externally, a common part, alias a scheduler shell, is enqueued in and dequeued from a ready queue. Internally, a specialized part, alias a scheduler core, is created, changed and deleted depending on the instructions of the scheduling context. Due to such a configuration, a scheduler can be dynamically changed without rebooting.

For example, a scheduling context includes a fixed priority scheduler (FP SC), a weighted fair queue scheduler (WFQ SC), and a fair-share queue scheduler (FSQ SC). The FP SC, the WFQ SC and the FSQ SC are the specialized parts of a scheduler. According to a policy, one of the schedulers is selected. Then, the scheduling center changes the central processing unit (CPU) scheduler of the node to the selected scheduler at step 630. Referring to FIG. 7, ready queues are distinguished according to schedulers. For example, an FP ready queue (RQ) corresponding to the FP SC, a WFQ RQ corresponding to the WFQ SC, and an FSQ RQ corresponding to the FSQ SC are individually included. When the FP SC is selected, a corresponding thread is enqueued in the FP ready queue, the threads of other schedulers (e.g. the WFQ SC) are dequeued from corresponding ready queues. The central processing unit (CPU) accesses the FP ready queue and processes the thread.

The input/output (I/O) scheduler also is configured to be dynamically changeable in a manner similar to that described with respect to the central processing unit (CPU) scheduler. That is to say, the scheduling context and ready queue of the input/output (I/O) scheduler are also divided into common parts and specialized parts depending thereon. One of the specialized parts is selected, and a scheduling center changes the input/output (I/O) scheduler of a node to the selected scheduler.

Figure 8:
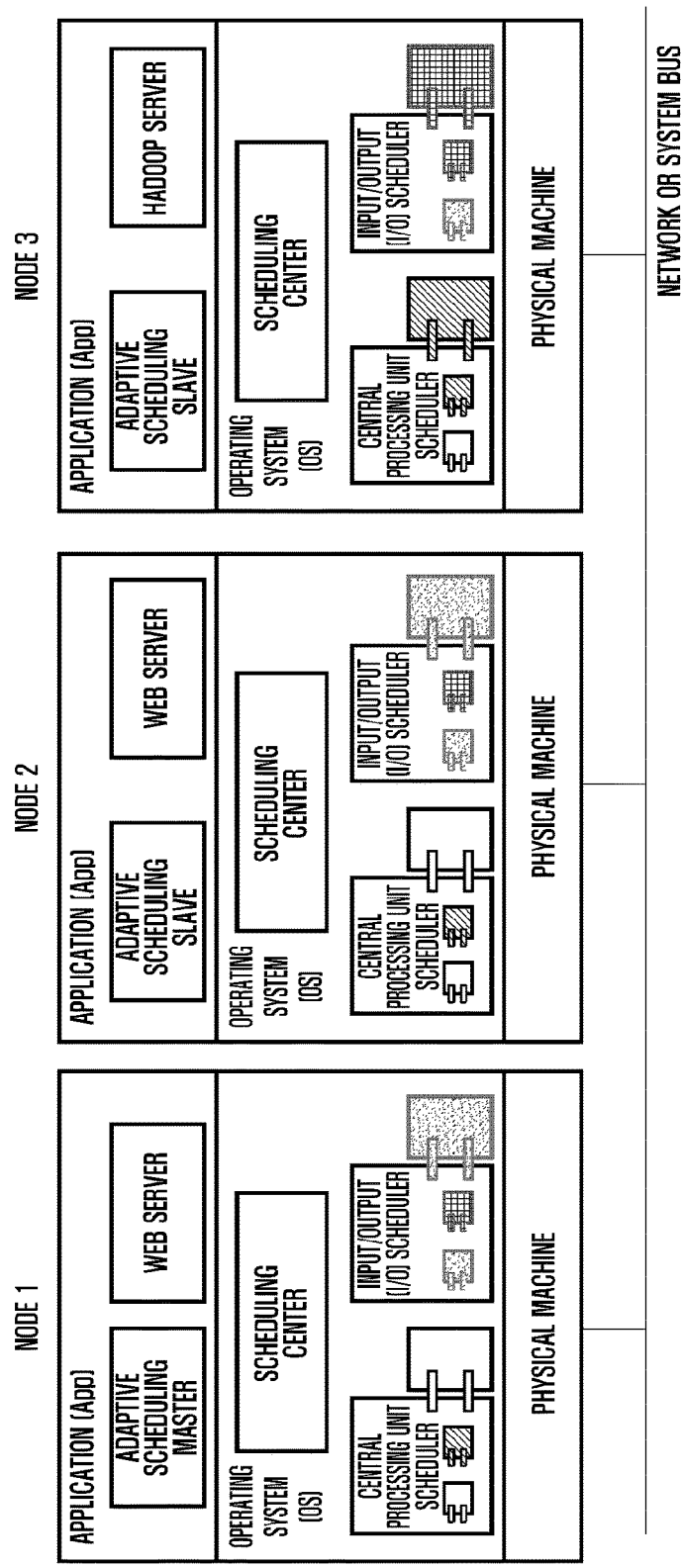
FIG. 8 is a diagram illustrating the configuration of a scheduling system according to another embodiment of the present invention.

FIG. 8 is a diagram illustrating the configuration of a scheduling system according to another embodiment of the present invention. Referring to FIG. 8, differently from FIG. 4, a scheduler interface directly has a plurality of schedulers. The scheduler interface selects one of multiple schedulers in response to an instruction of a scheduling center, and changes a scheduler of a corresponding node to the selected scheduler. The other configurations and operations are the same as those in the system illustrated in FIG. 4.

Figure 9:
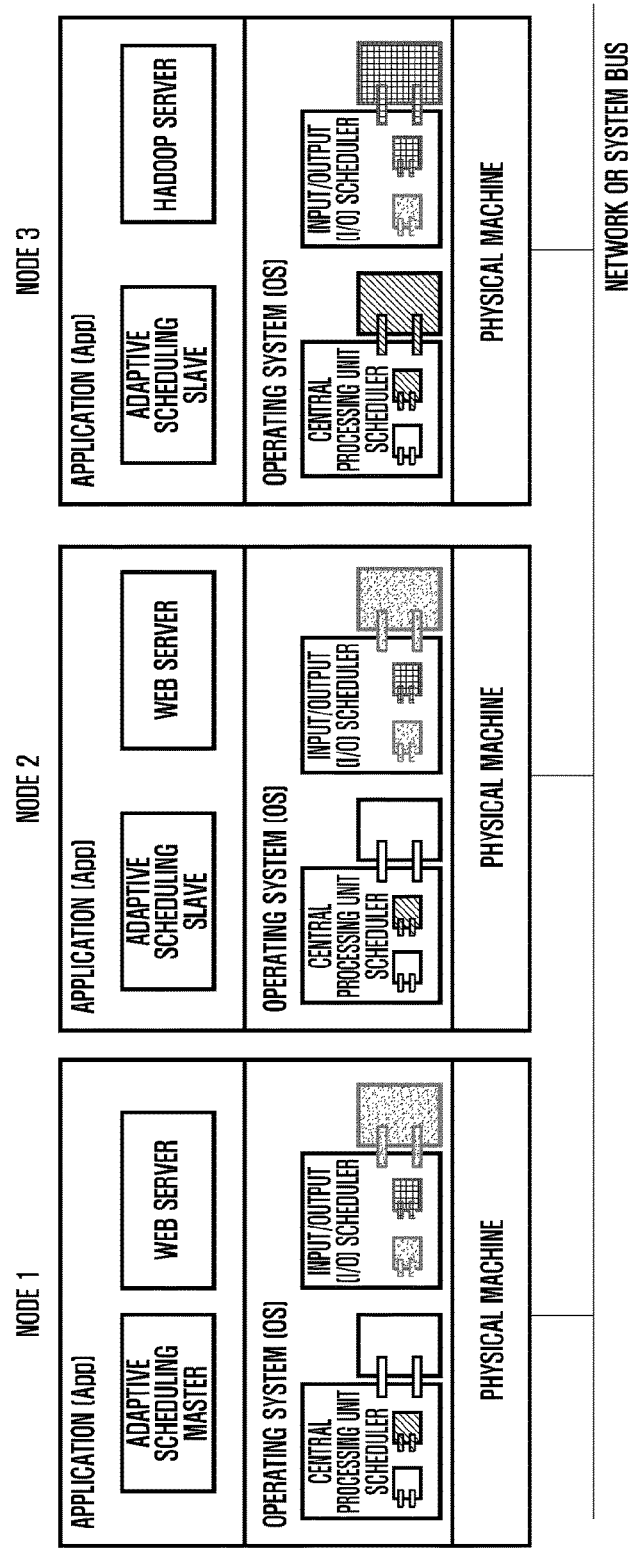
FIG. 9 is a diagram illustrating the configuration of a scheduling system according to still another embodiment of the present invention.

FIG. 9 is a diagram illustrating the configuration of a scheduling system according to still another embodiment of the present invention. Referring to FIG. 9, differently from FIG. 4, an operating system has no scheduling center. That is to say, a scheduler interface selects one of multiple schedulers according to an instruction of an "adaptive scheduling master" or an "adaptive scheduling slave", and changes a scheduler of a corresponding node to the selected scheduler. The other configurations and operations are the same as those in the system illustrated in FIG. 4.

Figure 10:
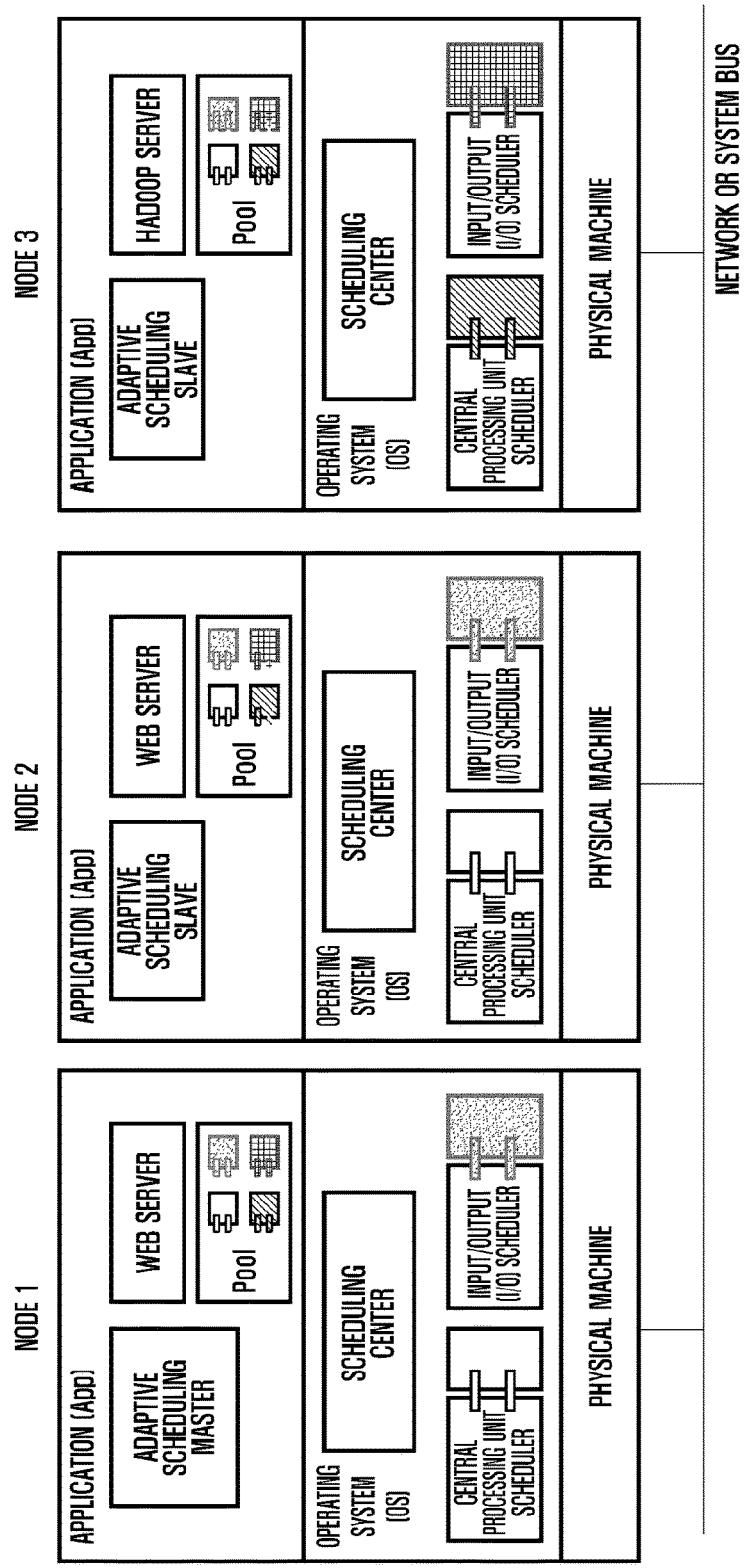
FIG. 10 is a diagram illustrating the configuration of a scheduling system according to still another embodiment of the present invention.

FIG. 10 is a diagram illustrating the configuration of a scheduling system according to still another embodiment of the present invention. Referring to FIG. 10, schedulers are placed in a user region, i.e. in an application region, and are inserted into an operating system according to necessity. A scheduling center performs a security check on an inserted scheduler. Such a scheduler may be in a binary form, or may be in the form of a source code. In the case of a source code, the source code is compiled before being inserted.

Figure 11:
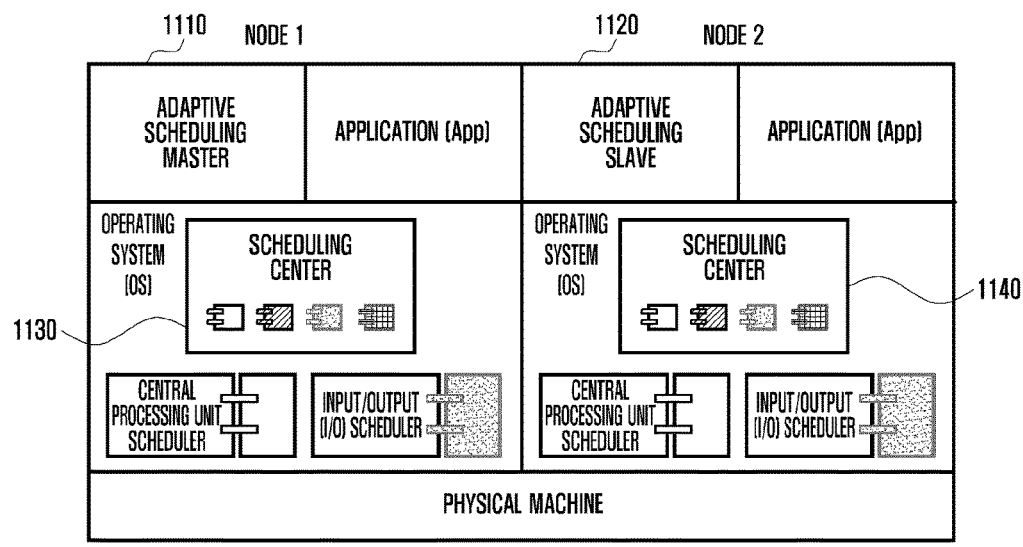
FIG. 11 is a diagram illustrating the configuration of a scheduling system according to still another embodiment of the present invention.

FIG. 11 is a diagram illustrating the configuration of a scheduling system according to still another embodiment of the present invention.

Referring to FIG. 11, a node of a scheduling system according to a still another embodiment of the present invention is one virtual machine in one computer (e.g. a portable terminal, such as a notebook personal computer (PC), a tablet PC, and a smart phone) which operates a plurality of virtual machines in one physical machine. Here, the physical machine is a component including a central processing unit (CPU) and a memory, and each of virtual machines is a component including an operating system and applications. The virtual machines share and use the physical machine using a well-known technique (e.g. a time division method).

According to still another embodiment of the present invention, a scheduling system is configured to include a plurality of nodes. Among the nodes, one node is a master node for determining a scheduling policy, and the remaining nodes are slave nodes. Referring to FIG. 11, Node 1 is a master node, and Node 2 is a slave node. Node 2 transmits application information Node 1, which is a master node. Here, the application information includes the name of an application, the operation characteristics (e.g. real-time (RT) or non-real-time (NRT)) of the application, interactivity, a batch, a priority, a weight, a deadline, a period, and the like. An adaptive scheduling master 1110 of Node 2 analyzes application information, and determines a scheduling policy (e.g. what are the optimal central processing unit (CPU) and input/output (I/O) schedulers suitable for the respective nodes, and which parameters are to be used in the scheduler) using a result of the analysis. Node 1 transmits the policy to Node 2. The master 1110 and a slave 1120 transfer the policy to scheduling centers 1130 and 1140, respectively. According to the policy, the scheduling centers 1130 and 1140 dynamically change the central processing unit (CPU) scheduler and the input/output (I/O) scheduler, or adjust parameters. A scheduler change has been described in detail with reference to FIGS. 6 and 7.

Figure 12:
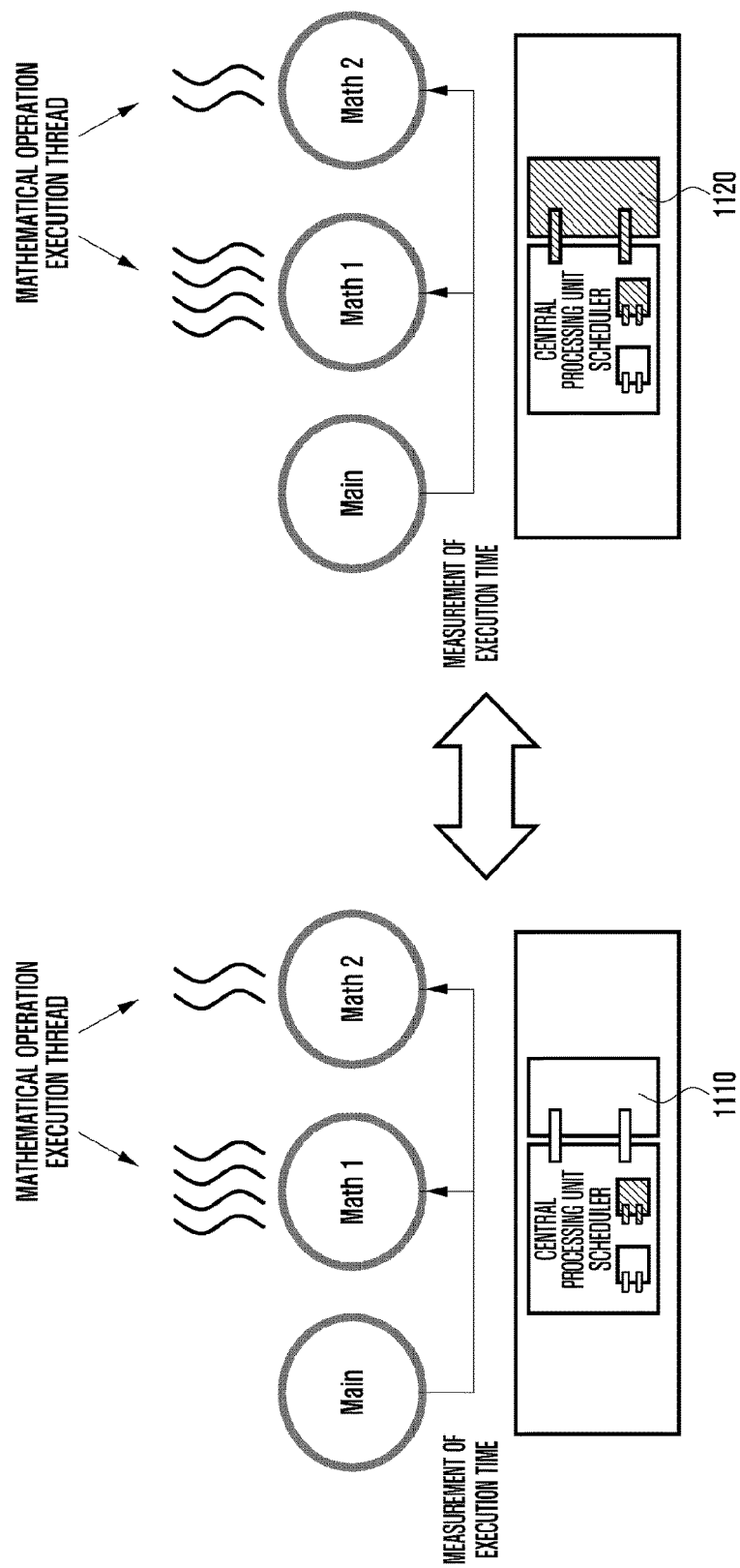
FIG. 12 is a diagram explaining a scenario according to an embodiment of the present invention.

FIG. 12 is a diagram explaining a scenario according to an embodiment of the present invention.

Referring to FIG. 12, three processes Main, Math1 and Math2 operate in a system. Math1 includes four threads each of which repeatedly performs a mathematical operation, and Math2 includes two threads each of which repeatedly performs a mathematical operation. An algorithm used in such a system includes a fixed-priority scheduling algorithm and a fair-share scheduling algorithm. Math1 and Math2 report, to Main, a sum of time for which the threads thereof use a central processing unit (CPU) during five seconds. Main instructs a central processing unit (CPU) scheduler to toggle the fixed-priority scheduling algorithm and the fair-share scheduling algorithm. The central processing unit (CPU) scheduler changes an algorithm during an operation, without rebooting.

When the priority and weight values of Math1 are set to 20 and 256, respectively, and the values of Math2 are set to 20 and 512, respectively, a fixed-priority scheduling algorithm 1210 uniformly assigns time to threads having the same priority. Therefore, a process having more threads uses the central processing unit (CPU) for more time. Thus, a central processing unit (CPU) use ratio of Math1 to Math2 becomes 4:2. In contrast, a fair-share scheduling algorithm 1220 assigns central processing unit (CPU) use time to thread according to a ratio of the weights of processes. The ratio of the weight of Math1 to the weight of Math2 is 1:2. Therefore, when time assigned to each thread of Math1 is "one", time as much as "two" is assigned to each thread of Math2. Thus, a central processing unit (CPU) use ratio of Math1 to Math2 is 4:4 (=1×4:2×2).

The aforementioned method according to the present invention can be implemented in the form of program instructions which can be executed by various computers and recorded in a recording medium readable by a computer. In this case, the recording medium may include program commands, data files, data structures, and the like. In addition, the program commands may be those specially designed and constructed for the purposes of the present invention, or may be those well known to and be useable by a person skilled in the computer software art. In addition, the recording medium may include: magnetic media such as hard disks, floppy disks, and magnetic tape; optical media such as CD-ROMs and DVDs; magneto-optical media such as floptical disks; and hardware devices such as ROMs, RAMs, flash memories, and the like. In addition, the program commands include not only a machine code, such as produced by a compiler, but also a higher language code that can be executed by the computer using an interpreter. The hardware devices may be configured to act as one or more software modules in order to implement the present invention.

The method and system according to the present invention are not limited to the aforementioned embodiments, and various changes and implementations based on the technical spirit of the present invention are possible in addition to the embodiments.

The invention claimed is:

1. A scheduling method of a control unit, the method comprising:
   detecting an event of requesting a scheduler change;
   selecting a scheduler corresponding to the event among schedulers, each of which schedules use of the control unit; and
   changing a scheduler of a node for the use of the control unit to the selected scheduler, without rebooting the node,
   wherein each of the schedulers is divided into a same common part and a mutually different specialized part,
   wherein the common part is configured with a common algorithm between the schedulers, while the specialized part is configured with different algorithms depending on the schedulers, and
   wherein changing the scheduler of the node comprises changing a specialized part of the scheduler of the node to a specialized part of the selected scheduler.

2. The method of claim 1, wherein the changing of a schedule comprises enqueuing a thread of the selected scheduler into a ready queue of the selected scheduler among ready queues.

3. The method of claim 2, wherein the specialized part of the selected scheduler is enqueued in a ready queue.

4. The method of claim 1, wherein the selecting of a scheduler comprises:
   receiving application information from another node;
   determining a scheduling policy using the application information; and
   selecting a scheduler corresponding to the scheduling policy among the schedulers.

5. The method of claim 4, wherein the application information comprises at least one among an application name, information related to an operation characteristic, information related to whether there is interactivity, information related to whether a batch is performed, a priority, a weight, a deadline, and a period.

6. The method of claim 4, further comprising transmitting the determined scheduling policy to the other node.

7. The method of claim 1, wherein the node is one server in a cloud system, or one computing node in a micro-server, or one virtual machine in one computer in which a plurality of virtual machines operate in one physical machine.

8. A system for providing an application service, the system comprising:
   a master node for determining a scheduling policy and scheduling computing according to the determined scheduling policy; and
   at least one slave node for scheduling computing according to the determined scheduling policy,
   wherein the master node is configured to:
   determine the scheduling policy using application information received from the slave node and application information of the master node,
   transmit the determined scheduling policy to the slave node,
   select a scheduler corresponding to the determined scheduling policy among schedulers, and
   change a scheduler of the master node to the selected scheduler without rebooting,
   wherein each of the master node and the slave node is one server in a cloud system, or one computing node in a micro-server, or one virtual machine in one computer in which a plurality of virtual machines operate in one physical machine,
   wherein each of the schedulers is divided into a same common part and a mutually different specialized part,
   wherein the common part is configured with a common algorithm between the schedulers, while the specialized part is configured with different algorithms depending on the schedulers, and
   wherein the master node is further configured to change a specialized part of the scheduler of the master node to a specialized part of the selected scheduler.

9. The system of claim 8, wherein the changing of a schedule of the master node to the selected scheduler comprises enqueuing a thread of the selected scheduler into a ready queue of the selected scheduler among ready queues.

10. The system of claim 9, wherein the specialized part of the selected scheduler is enqueued in a ready queue.

11. The system of claim 8, wherein the application information comprises at least one among an application name, information related to an operation characteristic, information related to whether there is interactivity, information related to whether a batch is performed, a priority, a weight, a deadline, and a period.

12. The system of claim 8, wherein each of an operating system of the master node and an operating system of the slave node comprises:
   a scheduling center having a plurality of central processing unit schedulers and a plurality of input/output schedulers;
   a central processing unit scheduler interface connected to a central processing unit scheduler selected by the scheduling center among the plurality of central processing unit schedulers; and
   an input/output scheduler interface connected to an input/output scheduler selected by the scheduling center among the plurality of input/output schedulers.

13. The system of claim 8, wherein each of an operating system of the master node and an operating system of the slave node comprises:
   a scheduling center;
   a central processing unit scheduler interface configured to have a plurality of central processing unit schedulers, to select one of the plurality of central processing unit schedulers in response to an instruction of the scheduling center, and to change a central processing unit scheduler of a corresponding node to the selected central processing unit scheduler; and
   an input/output scheduler interface configured to have a plurality of input/output schedulers, to select one of the plurality of input/output schedulers in response to an instruction of the scheduling center, and to change an input/output (I/O) scheduler of a corresponding node to the selected input/output scheduler.

14. The system of claim 8, wherein each of an operating system of the master node and an operating system of the slave node comprises:
   a central processing unit scheduler interface configured to have a plurality of central processing unit schedulers, to select one of the plurality of central processing unit schedulers in response to an instruction of an application, and to change a central processing unit scheduler of a corresponding node to the selected central processing unit scheduler; and
   an input/output scheduler interface configured to have a plurality of input/output schedulers, to select one of the plurality of input/output schedulers in response to an instruction of the application, and to change an input/output (I/O) scheduler of a corresponding node to the selected input/output scheduler.

15. The system of claim 8, wherein each of the master node and the slave node comprises:
   a plurality of central processing unit schedulers and a plurality of input/output schedulers which are placed in an application region;
   a central processing unit scheduler interface connected to one scheduler, which is inserted into an operating system, among the plurality of central processing unit schedulers; and
   an input/output scheduler interface connected to one scheduler, which is inserted into the operating system, among the plurality of input/output schedulers.

* * * * *